Dec. 1, 1925.

M. B. McLAUTHLIN 1,564,006

MACHINE FOR CUTTING SHEET MATERIAL

Filed Oct. 29. 1924   2 Sheets-Sheet 1

Inventor:
Martin B. McLauthlin,
by Arthur F. Randall
Atty.

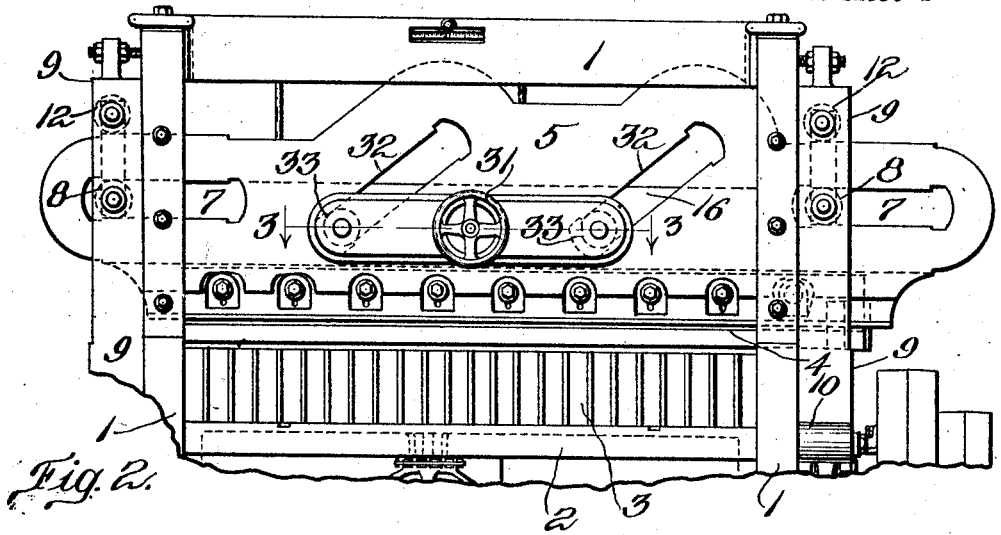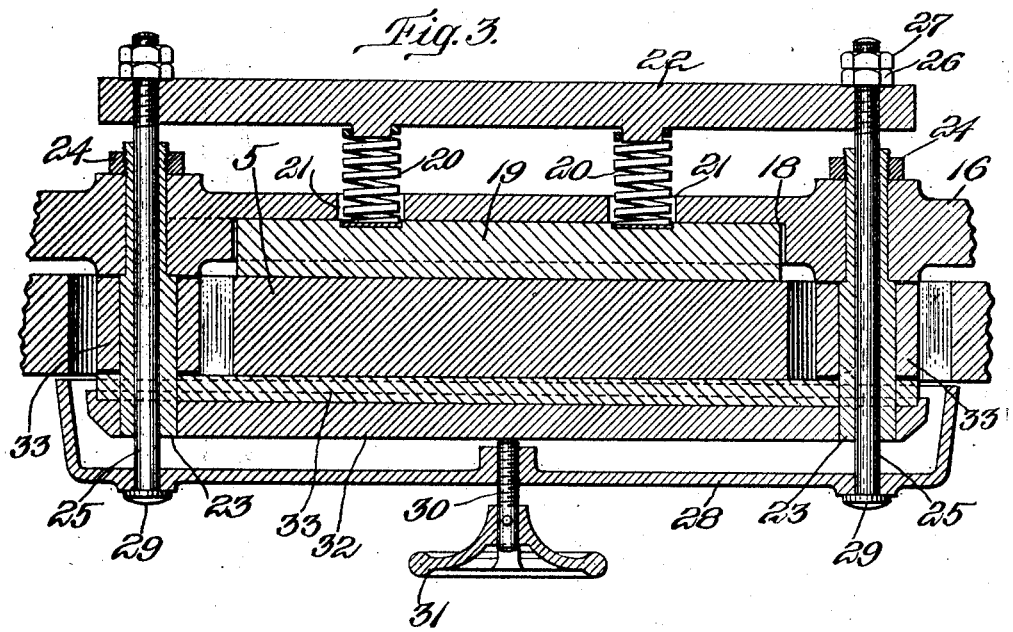

Patented Dec. 1, 1925.

1,564,006

UNITED STATES PATENT OFFICE.

MARTIN B. McLAUTHLIN, OF MALDEN, MASSACHUSETTS.

MACHINE FOR CUTTING SHEET MATERIAL.

Application filed October 29, 1924. Serial No. 746,514.

*To all whom it may concern:*

Be it known that I, MARTIN B. McLAUTHLIN, a citizen of the United States, residing at Malden, in the county of Middlesex and State of Massachusetts, have invented certain new and useful Improvements in Machines for Cutting Sheet Material, of which the following is a specification.

My invention relates to machines for cutting sheet material, particularly power operated paper cutting shears, and it has for its object to provide an improved machine of this class.

In one type of machine of this class the knife-carrying crosshead has mounted upon one side thereof a paper engaging and clamping bar that is frictionally controlled and operated automatically by the knife carrying crosshead, so as to move toward the paper with the crosshead and engage the paper in advance of the knife to clamp the paper immovably in position upon the bed and hold it against displacement while the knife is operating upon it.

In this type of machine as heretofore constructed provision was made for regulation or adjustment of the frictional engagement between the clamping bar and the knife-carrying cross-head, but the constructions employed have been such that the pressure established and maintained between the frictionally engaged surfaces or elements to effect the automatic operation of the clamping bar, has tended to displace and to warp the cross-head and knife carried thereby which, of course, was highly objectionable. A further disadvantage to the constructions heretofore proposed has been that, aside from being more or less complicated and lacking in durability, the operation of adjusting or regulating the friction devices was comparatively difficult and inconvenient.

Also, with machines of that class wherein the cutter operates with an oblique or drawing cutting stroke, the tendency of the paper or other sheet material, to shift or be displaced during the cutting stroke of the knife, varies with the toughness of the material being operated upon. That is, the resistance offered to the knife by different kinds of materials varies and consequently the tendency toward displacement of the paper by the knife is greater with some materials, or grades of material, than with others. As a result, frequent adjustment of the frictional connection between the knife carrying cross-head and clamp bar is necessary and this has heretofore required considerable attention and labor on the part of the operator, which was objectionable.

My invention obviates the above noted objectionable features characterizing machines of this class as heretofore constructed and it consists in certain novel features of construction and organization of parts hereinafter more fully set forth in the following description and particularly pointed out and defined in the claims at the close thereof.

In the accompanying drawings:

Figure 2 is a front elevation of the upper portion of the machine shown in Fig. 1.

Figure 3 is a section on line 3—3 of Fig. 2.

Figure 1:
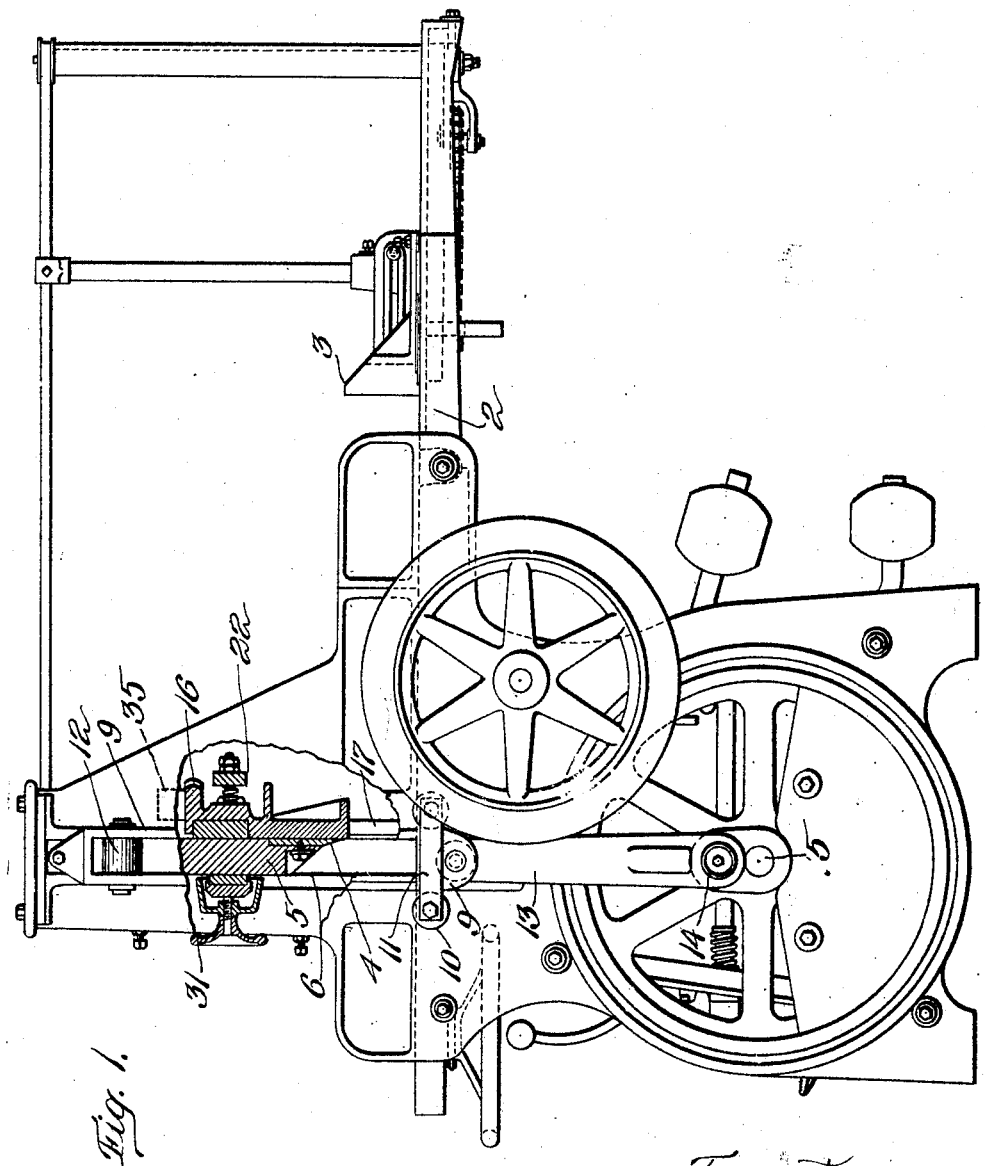
Figure 1 is a side elevation, partly broken away and in section, of a machine for cutting sheet material constructed in accordance with my invention.

Having reference to the drawings, 1 represents the frame of my improved machine for cutting sheet material, said frame including the usual bed or work rest 2 provided with an adjustable gauge 3. The bed 2 is also made, near its forward end, as usual, with a stationary knife, not shown, co-operating with a knife blade 4. The knife blade 4 is fastened to a cross-head 5 mounted in vertical ways 6 on the frame of the machine. At its ends the cross-head 5 is made with horizontal slots 7 to receive rolls 8 carried by slides 9 connected with the frame 1 with provision for vertical movement by the usual means including guide rolls 10 and cross-bars 11 mounted on frame 1. The slides 9 also carry rolls 12 engaging the top side of the cross-bar 5.

At their lower ends the slides 9 are pivotally connected with pitmen 13 whose opposite ends are connected with wrist pins 14 at the ends of the main shaft 15 of the machine. This main shaft 15 is driven and manually controlled through the usual means. When the shaft 15 is rotated it acts through the pitmen 13, slides 9 and rolls 8 and 12 to first lower and then raise the cross-head.

Immediately at the rear of the cross-head 5 is a clamp bar 16 mounted at its ends to slide upon vertical ways, one of which is shown at 17, on frame 1. The inner side of this clamp bar is made with a recess 18, Fig. 3, within which is mounted a friction shoe 19, preferably made from wood, which is urged laterally against the rear side of the cross-head 5 by two coiled springs 20. These two springs extend through holes 21 to the outside of bar 16 where they abut against a relatively short presser bar 22.

The clamp bar 16 is made with a pair of holes through it within which are fixed the shanks of two tubular studs 23, the shank of each of said studs being of less diameter than its forwardly extending body portion so as to provide a shoulder that is clamped against the clamp bar by a nut 24 on the threaded rear end of the shank. Within each tubular stud 23 is loosely mounted a pull rod 25 whose rear end extends beyond the clamp bar 16 through an aperture provided through the adjacent end of the presser bar 22 and is threaded to receive upon it a nut 26 bearing against the rear side of presser bar 22 and a jam nut 27. At its forward end each pull rod 25 extends beyond its stud 23, through an aperture provided through the adjacent end of a pull bar 28 and is provided at its end with a head 29 bearing against the outer side of said pull bar.

At its middle the pull bar 28 is made with a threaded aperture to receive an abutment screw 30 which is provided at its outer end with a hand wheel 31. At its inner end the abutment screw 30 bears against a two-part friction shoe comprising a metal holder member 32 and a wooden member 33. These two members are made, near their ends, with registering apertures to loosely receive the ends of the tubular studs 23.

The studs 23 extend through oblique slots 32 formed in the cross-head 5 and have loosely mounted upon them rollers 33 which normally occupy positions near the lower ends of said slots.

It will be clear that by adjustment of screw 30 springs 20 may be compressed to the desired degree and their inner or forward ends force the friction shoe 19 against the rear side of the cross-head while their opposite ends act through bar 22, pull bar 28, and screw 30 to force the friction shoe 32—33 against the opposite face of the cross-head. Thus equal pressures are exerted by the two friction shoes upon the opposite sides of the cross-head 5 so that there is no tendency toward distortion of the cross-head as heretofore.

When the machine is started the cross-head 5 is pulled downward as described, the frictional connection between said cross-head and the clamp bar 16 causing the latter to move with said cross-head until the clamp bar engages and comes to rest upon the paper, whereupon the frictional connection is overcome and the cross-head completes its downward movement alone. During this latter part of the downward movement of the cross-head the rolls 33 and studs 23 are held stationary and act to cam or deflect the cross-head endwise thus giving a drawing motion to the cutter as it descends and passes through the paper. Thus, the cross-head moves downward in a vertical path until the clamp bar comes to rest upon the paper after which the cross-head moves obliquely until it reaches the limit of its downward movement.

When the motion of the cross-head is reversed the frictional connection between the same and the clamp bar, causes the latter to move upwardly with the cross-head until the clamp bar engages the stop 35 that is provided for it, after which the cross-head continues its upward movement alone. During this latter part of the movement of the cross-head the studs 23 and rolls 33 are held stationary and act to cam or deflect the cross-head endwise back to the position from which it started. Thus the first part of the upward movement of the cross-head is vertical and the last part oblique.

The clamp bar 16 and cross-head 5 are constructed and associated so that the former engages the paper simultaneously with, or just in advance of, the latter during the downward movement of the cross-head. After the clamp bar has engaged the paper and while the knife is passing through the latter, the reaction of the upper sides of the oblique slots 32 against the rolls 33 caused by the resistance offered by the paper to the passage of the knife through it, serves to press and hold the clamp bar tightly down onto the paper, and it will be clear that this reaction will vary automatically with variations in the resistance. Thus the clamping pressure varies automatically according to the toughness of the stock being operated upon.

What I claim is:

1. In a machine of the character described, the combination of a knife-carrying cross-head; means for moving said cross-head up and down with provision for movement thereof endwise also; a vertically movable clamping bar for holding the material while being operated upon; a stop for limiting the upward movement of said bar; a spring pressed friction shoe connected with the clamping bar and frictionally engaging the cross-head; means for deflecting the cross-head endwise in one direction when the movement of the clamping bar is arrested by the material being operated upon during the downward travel of the cross-head, and means for deflecting the cross-head endwise in the opposite direction when the movement of the clamping bar is arrested by said stop during the upward travel of the cross-head.

2. In a machine of the character described, the combination of a knife carrying cross-head; means for moving said cross-head up and down with provision for movement thereof endwise also; a vertically movable clamping bar for holding the material while being operated upon; a stop for limiting the upward movement of said bar; a spring pressed friction shoe connected with the clamping bar and frictionally engaging the cross-head; means for deflecting the cross-head endwise in one direction when the movement of the clamping bar is arrested by the material being operated upon during the downward travel of the cross-head, said means causing the cross-head to react automatically upon the clamping bar to cause the latter to exert a clamping pressure upon the material being operated upon that is proportional to the resistance offered to the knife by said material, and means for deflecting the cross-head endwise in the opposite direction when the movement of the clamping bar is arrested by said stop during the upward travel of the cross-head.

3. In a machine of the character described, the combination of a knife carrying cross-head member; means for moving said cross-head member up and down with provision for movement thereof endwise also; a vertically movable clamping bar member for holding the material while being operated upon; a stop for limiting the upward movement of said clamping bar member; a spring pressed friction shoe connected with the clamping bar member and frictionally engaging the cross-head member, and a cam roll on one of said members co-operating with cam surfaces on the other member for deflecting the cross-head member endwise in one direction when the movement of the clamping bar member is arrested by the material being operated upon during the downward travel of the cross-head member and for deflecting the cross-head member endwise in the opposite direction when the movement of the clamping bar member is arrested by said stop during the upward travel of the cross-head member.

4. In a machine of the character described, the combination of a knife carrying cross-head member; means for moving said cross-head member up and down with provision for movement thereof endwise also; a vertically movable clamping bar member for holding the material while being operated upon; a stop for limiting the upward movement of said clamping bar member; a spring pressed friction shoe connected with the clamping bar member and frictionally engaging the cross-head member, and a cam roll on one of said members occupying an oblique slot in the other of said members and co-operating therewith to deflect the cross-head member endwise in one direction when the movement of the clamping bar member is arrested by the material being operated upon during the downward travel of the cross-head member and to deflect the cross-head member endwise in the opposite direction when the movement of the clamping bar member is arrested by said stop during the upward travel of the cross-head member.

5. In a machine of the character described, the combination of a knife carrying cross-head member; means for moving said cross-head member up and down with provision for movement thereof endwise also; a vertically movable clamping bar member for holding the material while being operated upon; a stop for limiting the upward movement of said clamping bar member; a pair of friction shoes carried by said clamping bar member and frictionally engaging the opposite sides of the cross-head member; a tubular stud on one of said members occupying an oblique slot in the other of said members and co-operating therewith to deflect the cross-head member endwise in one direction when the movement of the clamping bar member is arrested by the material being operated upon during the downward travel of the cross-head member and to deflect the cross-head member endwise in the opposite direction when the movement of the clamping bar member is arrested by said stop during the upward travel of the cross-head member; a pull rod extending through said tubular stud; a spring through which one end of said rod acts upon one of said shoes; means through which the other end of said rod acts upon the other shoe, and means for adjusting the stress of said spring.

6. In a machine of the character described, the combination of a knife carrying cross-head member; means for moving said cross-head member up and down with provision for movement thereof endwise also; a vertically movable clamping bar member for holding the material while being operated upon; a stop for limiting the upward movement of said clamping bar member; a pair of friction shoes carried by said clamping bar member and frictionally engaging the opposite sides of the cross-head member; a pair of tubular studs on said clamping bar member occupying oblique slots in the cross-head member and co-operating therewith to deflect the cross-head member endwise in one direction when the movement of the clamping bar member is arrested by the material being operated upon during the downward travel of the cross-head member and to deflect the cross-head member endwise in the opposite direction when the movement of the clamping bar member is arrested by said stop during the upward travel of the cross-head member; pull rods extending through said tubular studs; a presser bar alongside the clamping bar member and connected with the adjacent ends of said pull rods; a spring between said presser bar and the adjacent friction shoe; a pull bar alongside said cross-head member and connected with the opposite ends of said pull rods, and an adjustable abutment screw carried by said pull bar and engaging the adjacent friction shoe.

7. In a machine of the character described, the combination of a knife carrying cross-head member; means for moving said cross-head member up and down with provision for movement thereof endwise also; a vertically movable clamping bar member for holding the material while being operated upon; a stop for limiting the upward movement of said clamping bar member; a pair of friction shoes carried by said clamping bar member and frictionally engaging the opposite sides of the cross-head member; a pair of tubular studs on said clamping bar member occupying oblique slots in the cross-head member and co-operating therewith to deflect the cross-head member endwise in one direction when the movement of the clamping bar member is arrested by the material being operated upon during the downward travel of the cross-head member and to deflect the cross-head member endwise in the opposite direction when the movement of the clamping bar member is arrested by said stop during the upward travel of the cross-head member; anti-friction rolls mounted upon said studs; a presser bar alongside the clamping bar member and connected with the adjacent ends of said pull rods; a pair of springs between said presser bar and the adjacent friction shoe; a pull bar alongside said cross-head member and connected with the opposite ends of said pull rods, and an adjustable abutment screw carried by said pull bar and engaging the adjacent friction shoe.

8. A machine constructed in accordance with claim 6 wherein one of the friction shoes comprises two parts one of which is made of wood or the like and contacts with the cross-head member and the other of which is a metal holder for the wooden part and is engaged by said abutment screw.

9. In a machine of the character described, the combination with the knife carrying cross-head, of a clamping bar constructed with a friction clamp having two friction shoes engaging opposite sides of the cross-head with equal pressure.

10. In a machine of the character described, the combination with the knife carrying cross-head, of a clamping bar constructed with a spring clamp having two spring pressed friction shoes engaging opposite sides of the cross-head with equal pressure.

11. In a machine of the character described, the combination with the knife carrying cross-head, of a clamping bar constructed with a spring clamp having two spring pressed friction shoes engaging opposite sides of the cross-head with equal pressure, and means for simultaneously adjusting the pressure of the two shoes.

MARTIN B. McLAUTHLIN.